Feb. 6, 1934.  R. GIESEY  1,945,937
DRILL
Filed May 6, 1933

Russell Giesey
INVENTOR.

BY
J. Vincent Martin
ATTORNEY.

Patented Feb. 6, 1934

1,945,937

UNITED STATES PATENT OFFICE 1,945,937

DRILL

Russell Giesey, Oklahoma City, Okla., assignor to Reed Roller Bit Company, Houston, Tex., a corporation of Texas Application May 6, 1933. Serial No. 669,625

4 Claims. (Cl. 255—73)

This invention relates generally to deep well drills and specifically to drill cutter mountings.

Although it may be used in drills of various types, it will be found particularly useful in reamers of the roller cutter type.

It has for its general object the provision of a new and improved mounting to reduce the wear on the cutter mounting parts and to provide new and improved parts that may quickly and easily be replaced when worn, and to insure the free rotation of the roller cutter.

Other objects will hereinafter appear.

Figure 1:
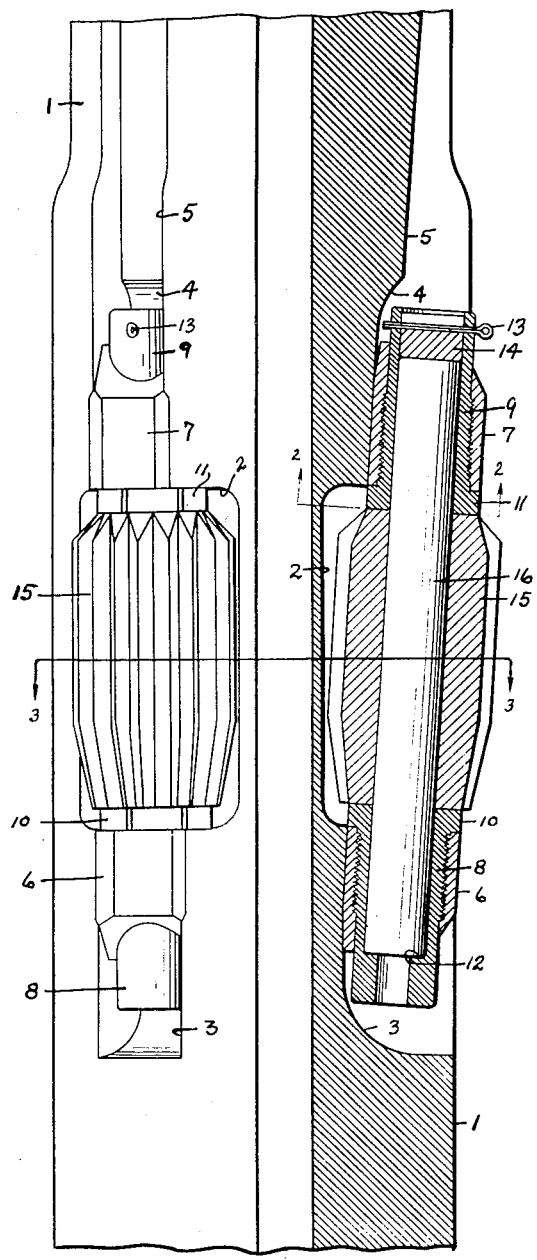
Figure 2:
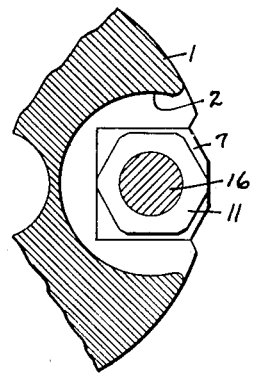
Figure 3:
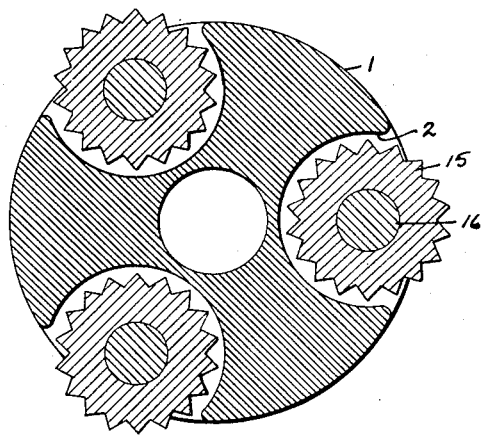

The preferred embodiment of the invention in a reamer is illustrated by the accompanying drawing wherein Fig. 1 is a partly sectional fragmentary elevation of a reamer, and Figs. 2 and 3 are horizontal sections on the lines 2—2 and 3—3 of Fig. 1 respectively.

In the drawing the reamer body is indicated at 1. It has a cutter recess 2 and block recesses 3 and 4. Leading from the block recess 4 is a pin groove 5. Within the block recesses 3 and 4 are blocks 6 and 7 that are preferably welded therein. And oppositely threaded within the blocks 6 and 7 are bushings 8 and 9. The bushings are insertable in the blocks 6 and 7 from the cutter recess 2 and are provided with shoulders 10 and 11 to bear against said blocks. In the embodiment shown, the shoulders are square flanges to which a conventional wrench may be applied. The bushing 8 has an internal shoulder 12, and in the bushing 9 is a cotter pin 13 against which the plug 14 bears as hereinafter stated. In the cutter recess 2 is a cutter 15 rotatable on a pin 16 floating in the bushings 8 and 9.

The parts are assembled as follows:

The blocks 6 and 7 are welded in the block recesses 3 and 4 to form a part of the body 1. The bushings 8 and 9 are threaded in the blocks 6 and 7 from the cutter recess 2, one of said bushings having a right-hand thread and the other of said bushings having a left-hand thread. The cutter 15 is then placed in the recess 2 and the cutter pin 16 is inserted through the pin groove 5, through the bushing 9, through the cutter 15 and into bushing 8 adjacent shoulder 12. The plug 14 is then placed in the bushing 9 and the cotter pin inserted thereabove to hold it in place.

It will be obvious that the cutter pin 16 will float in the bushings 8 and 9 and the cutter 15 will rotate on the cutter pin 16, and that the parts may be easily assembled, taken apart and replaced.

The invention, as defined by the following claims, is not limited to the preferred embodiment herein disclosed.

I claim:

1. A reamer having a body, said body having a cutter recess, block recesses adjacent opposite ends of said cutter recess, and a pin groove extending from one of said block recesses; a block in each of said block recesses; bushings oppositely threaded in said blocks; said business being insertable into said blocks from said cutter recess and having annular shoulders to bear against said blocks; that bushing in that block remote from said groove having an internal shoulder; a reamer cutter in said cutter recess between the annular shoulders of said bushings; a cutter pin insertable through said groove, through that block adjacent said groove, through said cutter and into that block remote from said groove, adjacent the internal shoulder of said remote block; and a removable cotter pin to limit the movement of said cutter pin away from said internal shoulder so that said pin floats in said bushings and cutter.

2. A reamer having a body, said body having a cutter recess, block recesses adjacent opposite ends of said cutter recess, and a pin groove extending from one of said block recesses; a block in each of said block recesses; bushings oppositely threaded in said blocks; said bushings being insertable into said blocks from said cutter recess; that bushing in that block remote from said groove having an internal shoulder; a reamer cutter in said cutter recess between said bushings; a cutter pin insertable through said groove, through that block adjacent said groove, through said cutter and into that block remote from said groove, adjacent the internal shoulder of said remote block; and a removable means to limit the movement of said cutter pin away from said internal shoulder so that said pin floats in said bushings and cutter.

3. A reamer having a body, said body having a cutter recess, block recesses adjacent opposite ends of said cutter recess, and a pin groove extending from one of said block recesses; a block in each of said block recesses; bushings in said blocks; said bushings being insertable into said blocks from said cutter recess; a reamer cutter in said cutter recess between said bushings; a cutter pin insertable through said groove through that block adjacent said groove, through said cutter and into that block remote from said groove; and means to limit the axial and to permit rotary movement of said cutter pin in said bushings.

4. A drill having a body, said body having a cutter recess, block recesses adjacent opposite ends of said cutter recess; a block in each of said block recesses; bushings insertable into said blocks; a cutter in said cutter recess between said bushings; a cutter pin insertable into said blocks and through said cutter; and means to limit the axial and to permit rotary movement of said cutter pin in said bushings.

RUSSELL GIESEY.